United States Patent [19]

Huang

[11] Patent Number: 4,741,256

[45] Date of Patent: May 3, 1988

[54] VEHICULAR INTERNAL VENTILATING DEVICE

[75] Inventor: Feng-Lin Huang, Keelung, Taiwan

[73] Assignee: Tech Zeal Industrial Company, Ltd., Taiwan, Taiwan

[21] Appl. No.: 813

[22] Filed: Jan. 6, 1987

[51] Int. Cl.⁴ .............................................. B60H 3/06
[52] U.S. Cl. ..................... 98/2.14; 98/2.11; 98/2.18; 98/900
[58] Field of Search .................. 98/2, 2.02, 2.11, 2.14, 98/2.15, 2.18, 3, 13, 900

[56] References Cited

U.S. PATENT DOCUMENTS

| | | | |
|---|---|---|---|
| 856,934 | 6/1907 | Archer | 98/13 |
| 1,445,732 | 2/1923 | Vondracek | 98/2.14 X |
| 1,525,429 | 2/1925 | Hunter | 98/13 X |
| 1,956,509 | 4/1934 | Lewis | 98/2.14 |
| 2,631,518 | 3/1953 | Brandenburg | 98/2.14 |
| 2,635,523 | 4/1953 | Hunter | 98/13 |

FOREIGN PATENT DOCUMENTS 48407  7/1984  Japan ..................... 98/2.18

*Primary Examiner*—Harold Joyce
*Attorney, Agent, or Firm*—Ostrolenk, Faber, Gerb & Soffen

[57] ABSTRACT

A vehicular internal ventilating device, which includes: an air inlet device, it sucks in fresh air without direct blowing to the driver of passengers; an air exhaust device, it expels the vehicular internal used air and guides the flow direction of the fresh air, and a power supply. The air inlet device sucks in fresh air from the external top front end roof just above windshield and blows it upwardly to the internal top front end ceiling of a vehicle, then, the reflected fresh air current comes to the front seats and the back seats in a curved flow line style and goes out through the exhausting device from the lower side of the back seats. In this way, even the windows of a vehicle are tightly closed, fresh air ventilation and passenger comfortness can still be maintained.

10 Claims, 3 Drawing Sheets

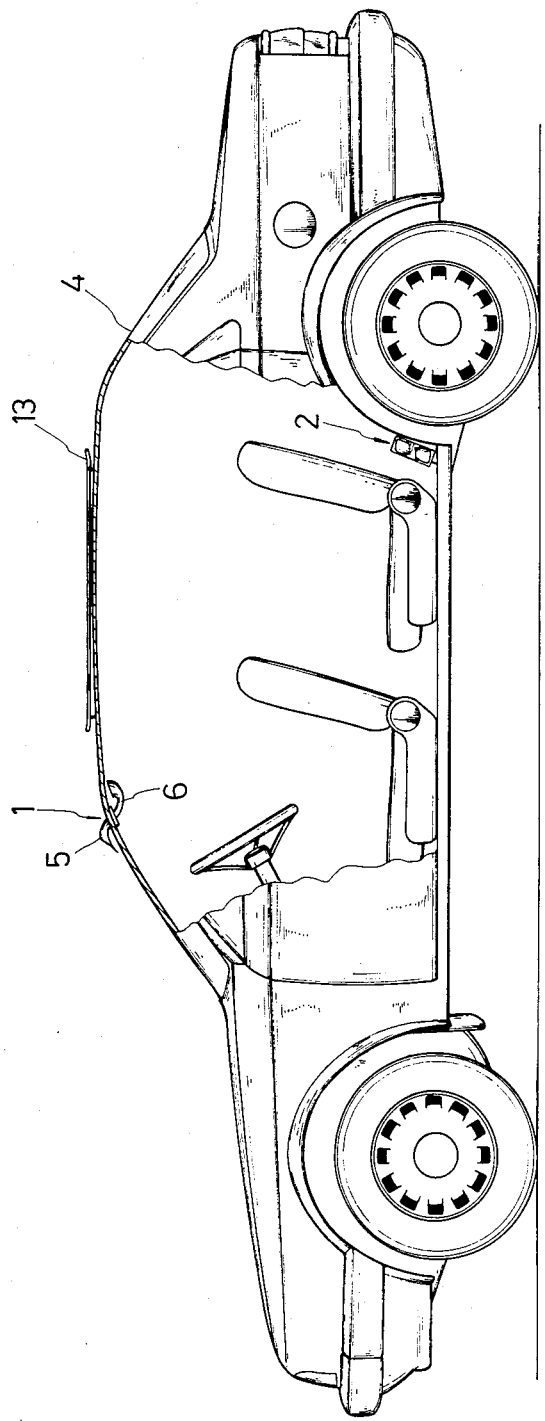

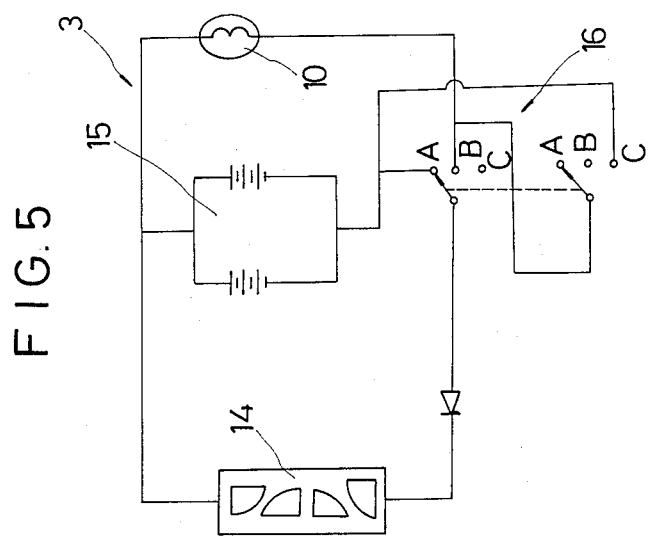
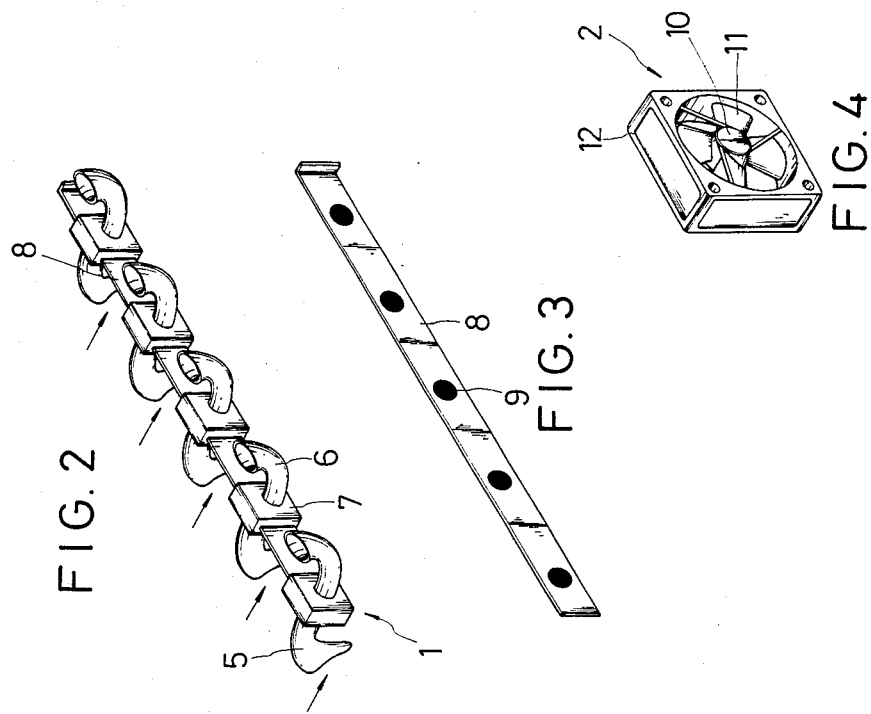

VEHICULAR INTERNAL VENTILATING DEVICE

FIELD OF THE INVENTION

The invention is related to a vehicular internal ventilating device, especially the inlet air is not directly blowing to the driver or passengers, and even the windows of a vehicle is tightly closed the internal air circulation of a vehicle can still be maintained, and during cold or raining days the internal sides of the windshield and windows of a vehicle will never become foggy.

BACKGROUND OF THE INVENTION

In recent years, because the economical, industrial and business prosperity people's livelihood has been greatly promoted, and taxi-cabs and private cars become so popular. During winter time, if the windows of a vehicle is tightly closed, not only the windshield and windows of a vehicle will become foggy which blocks out driver's sight, but also the air in the passenger compartment of a vehicle will gradually become dirty, the worst of it is the passengers smoke in the passenger compartment, if for the ventilation purpose some windows of the vehicle are partly opened, cold wind and some times with rain drops will blow into the passenger compartment which disturbs both driver and passengers and may even cause them sick.

OBJECTS OF THE INVENTION

The objects of the invention are to solve the above-said shortcomings and at the same time to provide a vehicular air refreshing device which possesses the following special features:

1. The inlet air will not blow to the driver and passengers' faces that causes feeling of piercing cold.
2. The air inlet ports are provided with air filters, therefore, dusts are prevented from coming into the passenger compartment to keep it clean.
3. Because the air inlet ports and exhaust ports are property arranged, the inlet fresh air flows slowly toward and to be efficiently utilized by each person as they seated in the passenger compartment.
4. Because this ventilation, the internal side of windshield and windows of a vehicle will not become foggy during cold or raining days, the driving safty is thus maintained.
5. Even windows of a vehicle is tightly closed, the driver and passengers can still enjoy fresh air without any tiredness feeling.

SUMMARY OF THE INVENTION

A vehicular internal ventilating device, which comprises of mainly: an air inlet device, an air exhaust device, and a power supply. Air inlet device sucks fresh air from the external top front end roof just above windshield and blows it upwardly to the internal top front end ceiling of a vehicle, then, the reflected fresh air current comes to the fornt seats and back seats in a curved flow line style and goes out through the air exhaust device form the lower side of the back seats. In this way, even the windows of a vehicle are tightly closed, fresh air ventilation and passenger comfortness can still be maintained, in addition to the internal sides of windshield and the windows of a vehicle will never become foggy during cold or raining days.

BRIEF DESCRIPTION OF THE DRAWINGS

FIG. 1 shows the locations of the invention which is installed in a vehicle.
FIG. 2 shows the air inlet device of the invention.
FIG. 3 shows the structure of the push door strip of the invention.
FIG. 4 shows the air exhaust device of the invention.
FIG. 5 shows the power supply circuit diagram of the invention.

SPECIFIC DESCRIPTION

Figure 6:
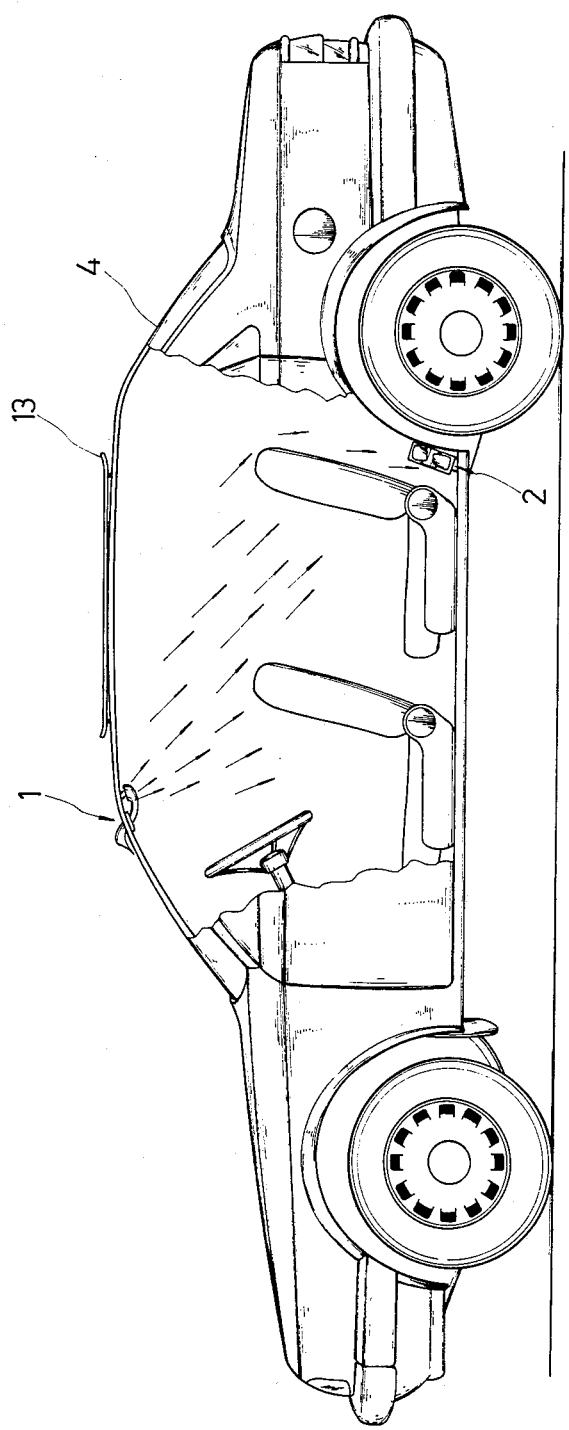
FIG. 6 shows the flow lines of the fresh inlet air of the invention.

From above said figures it can be seen that the invention comprises of an air inlet device 1, an air exhaust device 2, and a power supply device 3. In which, the air inlet device 1 (as shown in FIGS. 1 and 2) is installed on the front top end portion just above windshield of the passenger compartment or other proper location of a vehicle 4, it comprises of external wind tubes 5, internal wind tubes 6, wind tube seats 7, push door strip 8, and air filters 9. The external wind tubes 5 are installed externally to the passenger compartment of a vehicle, and they are connected to their respective own wind tube seats 7, and each external wind tubes are formed into an arched conical shape with a slant cut air inlet port, which can suck in a large amount of fresh air without rain water drops. The internal wind tubes 6 are located inside the passenger compartment and they are connected to their respective own wind tube seats 7, the internal wind tubes are also formed into an arched conical shape with their outlet ports facing upwardly to the top front end ceiling just above the windshield, through this arrangement, the speed and pressure of this reflected fresh air current is greatly reduced, therefore, the passengers can only feel the existence of a gentle wind or even not notice its existence. The wind tube seats 7 can be formed into a flat rectangular shaped integrated seat for the connection of several wind tube sets, or to be formed into a flat rectangular shaped individual seat for the connection of a single wind tube set. A push door strip is installed in the wind tube seat, and each door opening 8 is provided with an air filter 9, when the door openings 8 are switched inbetween external wind tubes and internal wind tubes by the switching action of the push door strip, the fresh air free from dust is sucked into the passenger compartment of a vehicle, when the door openings are switched out of alignment with external and internal wind tubes, the fresh air inlet passages are closed by the push door strip 8, and no more fresh air will come into the passenger compartment of a vehicle.

As shown in FIGS. 1 and 3, the air exhaust device 2 is mounted on the wall under the back seats which separates the passenger compartment and luggage compartment of a vehicle, therefore, the used air is expelled out of a vehicle via the luggage compartment (as shown in FIG. 5), also, the fresh air flowing direction is guided by this air exhaust device. Air exhaust device comprises of a DC motor 10, a fan blade 11, and a frame 12. Frame 12 is a rectangular shaped structure, it is mounted on the opening of the wall which separates the passenger compartment and luggage compartment, the central portion of frame 12 is provided with a motor 10, the axle of the motor 10 is provided with a fan blade 11, therefore, when the motor 10 is running, the used air in the passenger compartment will be expelled out form the vehicle via the luggage compartment. The electric power supplied to the motor 10 can be obtained from the solar cell board 13 and 14 which is mounted on the roof of a vehicle, or to be supplied by the vehicle's storage battery 15, in either means, the electric power supplied to the motor 10 is controlled by a switching unit 16, position A of this switching unit is to utilize the solar cell 13 and 14 to charge the storage batteries 15 of a vehicle; position B of the switching unit is to utilize the solar cell 13 and 14 to drive the motor 10; position C of the switching unit is to utilize the storage batteries 15 of a vehicle to drive the motor 10.

We claim:

1. A vehicular internal ventilation device for a vehicle having a passenger compartment and a luggage compartment and a back wall between said passenger compartment and said luggage compartment, seats against said back wall and a windshield, the ventilation device comprising: an air inlet device, an air exhaust device, and a power supply device; the air inlet device being installed on the front top end portion of the passenger compartment just above the windshield, the air inlet device including external wind tubes, internal wind tubes, wind tube seats for each of the tubes, a push door strip, and air filters; the external wind tubes being located externally to the passenger compartment and being connected to their respective wind tube seats; each external wind tube being formed into an arched conical shape with a slant cut air inlet port; the internal wind tubes being located inside the passenger compartment and being also connected to their respective wind tube seats; the internal wind tubes being also formed into an arched conical shape with their outlet ports facing upwardly to the top front end ceiling just above the windshield of the passenger compartment; the wind tube seat arranged to hold pairs of external and internal wind tubes, the push door strip being installed in the wind tube seat; door openings provided on the push door strip, one door opening for each tube seat; the door openings being provided with air filters; the push door strip being so arranged that when it is switched with its openings in alignment with a pair of external and internal wind tubes, the fresh air will come into the passenger compartment of the vehicle, and when the push door strip is switched with its door openings out of alignment with this pair of external and internal wind tubes, the fresh air inlet passages are closed preventing fresh air from coming into the passenger compartment of the vehicle; the air exhaust device being installed under the back seats on the wall which separates the passenger compartment and luggage compartment; the air exhaust device comprising a DC motor, a fan blade, and a frame; the back wall having an opening, the frame being mounted at the opening of the back wall, the central portion of the frame carrying the DC motor which is connected for driving the fan blade.

2. The vehicular ventilation device of claim 1 wherein a power supply for the ventilation device is provided independent of the vehicle power supply.

3. The vehicular ventilation device of claim 1 wherein the vehicle has an electrical power supply, which is also connected to operate the vehicular ventilation device.

4. The vehicular ventilation device of claim 1 wherein the wind tube seat comprises a flat rectangular structure formed by combining several wind tube seats into an integrated wind tube seat unit to connect several sets of the external and internal wind tube pairs.

5. The vehicular ventilation device of claim 1 wherein the wind tube seat comprises a flat rectangular structure formed by an individual wind tube seat to connect a set of the external and internal wind tube pairs.

6. An internal ventilation device for a vehicle having a passenger compartment, a back wall for the passenger compartment with seats against said back wall and a windshield, said ventilation device comprising:

an air inlet device, an air exhaust device and a power supply;

said air inlet device having at least one external wind tube, said tube being shaped into an arched conical shape with a slant cut air inlet port;

at least one wind tube seat; said external wind tube being connected to said wind tube seat;

an internal wind tube for each of said external wind tubes, said internal wind tubes being connected to said wind tube seat;

said internal wind tubes being also formed into an arched conical shape and having the outlet thereof facing upwardly in the compartment above the windshield;

at least one push door valve strip means of said wind tube seat movable in one direction to establish a path between said external tube and said internal tube and in another direction to close said path.

7. The internal ventilation device of claim 6 wherein at least one air filter is placed between said internal tube and said external tube.

8. The internal ventilation device of claim 6 wherein the external and internal wind tubes are arranged face to face at the wind tube seats.

9. The internal ventilation device of claim 6 wherein an opening is provided in said back wall and seats are provided against said back wall and the air exhaust device is mounted at said opening and beneath said seats.

10. The internal ventilation device of claim 6 wherein the external wind tubes extend outside the passenger compartment.

* * * * *